US006443050B2

(12) United States Patent
Timm

(10) Patent No.: US 6,443,050 B2
(45) Date of Patent: Sep. 3, 2002

(54) APPLIANCE FOR THE PREPARATION OF HOT BEVERAGES

(76) Inventor: Eberhard Timm, Harburger Strasse 32 a, Rosengarten (DE), 21224

( * ) Notice: Subject to any disclaimer, the term of this patent is extended or adjusted under 35 U.S.C. 154(b) by 0 days.

(21) Appl. No.: 09/761,377

(22) Filed: Jan. 16, 2001

(30) Foreign Application Priority Data

Jan. 20, 2000 (EP) .............................................. 00101087

(51) Int. Cl.⁷ ................................................ A47J 31/00
(52) U.S. Cl. ........................... 99/299; 99/323.3; 99/285
(58) Field of Search .................... 99/279, 283, 299, 99/306, 284, 323, 285, 323.3, 316

(56) References Cited

U.S. PATENT DOCUMENTS 1,701,194 A * 2/1929 Rosenstein et al. ........... 99/299
5,287,796 A * 2/1994 Timm ........................ 99/299 X
5,862,739 A * 1/1999 Lin ........................... 99/299 X

* cited by examiner

Primary Examiner—Reginald L. Alexander
(74) Attorney, Agent, or Firm—Alix, Yale & Ristas, LLP

(57) ABSTRACT

The appliance for the preparation of hot beverages, soups and similar nutritional/luxury foods, with a drinking cup (1) and with a container (2) to be arranged therein being provided with a heating device (11) and intended for the liquid (10) to be heated, which, after being heated, is emptied into the drinking cup (1) after a valve (26) of the container (2) has been opened, is distinguished in that the valve (26) is provided with actuating devices (28), by way of which the valve is closed when the container (2) is inserted into the drinking cup (1) and is opened when the container is removed.

18 Claims, 7 Drawing Sheets

APPLIANCE FOR THE PREPARATION OF HOT BEVERAGES

BACKGROUND OF THE INVENTION

The invention relates to an appliance for the preparation of hot beverages, soups and similar nutritional/luxury foods, with a drinking cup and with a container to be arranged therein being provided with a heating device and intended for the liquid to be heated, which, after being heated, is emptied into the drinking cup after a valve of the container has been opened.

Beverages can be prepared in transit by means of previously known appliances of this type (EP 0 382 001 B, EP 0 479 111 B). For this purpose, a container, which is filled or is to be filled with liquid and has a heating device, is inserted into a drinking cup. The drinking cup, the container arranged therein and having liquid, and the heating device are then inserted into a special holder, by means of which current is supplied to the heating device, so that the liquid is heated and begins to boil. As a result of the excess pressure occurring during boiling, the valve opens, so that the heated liquid flows into the drinking cup and brews up a brewing substance arranged there or at the outflow orifice of the container. Although this arrangement is highly expedient and makes it possible at any time to prepare hot beverages, hot soups or the like in transit, the design is complicated, since a special holder is required. The previously known appliance therefore has the disadvantage of high manufacturing and production costs which are necessitated by the high outlay on manufacture. Moreover, a holder necessary for the appliance has to be mounted in the vehicle, and this is also troublesome. The same applies, of course, when the appliance is to be used at home or in the office.

The object of the invention is to provide an appliance of the type mentioned in the introduction, which can be produced with a lower outlay on manufacture and is to be operated without special holders or merely with holders which are present in any case in modern motor vehicles.

In the solution according to the invention, the valve is provided with actuating devices, by means of which said valve is closed when the container is inserted into the drinking cup and is opened when said container is removed.

The container can simply be placed into the drinking cup. There is no longer any need for a special holder for the supply of current. Instead, the drinking cup can be placed on a flat surface in the office or at home or inserted into the beverage holder in the vehicle. After the container is inserted into the drinking cup, the former is filled with liquid, in particular water. The current supply is then subsequently switched on, and, in the case of a vehicle or even a ship, this can be the 12-V or 24-V power supply. For use at home or in the office, the appliance can be designed to operate with a 110-V or 220-V alternating current. However, a transformer could also be provided for operating the appliance at home, so that the same appliance can be used both at home or in the office on the one hand, and in a vehicle on the other hand.

Filling the container with liquid is appreciably simpler, since, in contrast to previously known appliances, the container does not have to be closed in a pressure-tight manner so that the valve can be opened by excess pressure after the desired temperature is reached. Instead, for example, a simple folding lid on the container can be provided, by means of which the liquid is introduced. After the desired temperature is reached, the container is lifted out of the drinking cup, the valve then opening automatically, so that the brewing substance located in the drinking cup is brewed up.

In an advantageous embodiment, there is provision for pivotably mounting on the lower circumferential edge of the container a two-armed lever, the first arm of which extends upwards from the bearing point and the second arm of which is arranged below the container bottom and is designed in such a way that, during the pivoting of the first arm relative to the container, said second arm pulls the valve, prestressed into the opening position, into the closed position.

When the container is outside the drinking cup, the valve is pressed into the opening position, the moveable valve disc pulling the second arm towards the container bottom, with the result that the first arm is moved outwards about the lower pivot point. When the container is then inserted into the drinking cup, the first arm is pressed towards the container again, with the result that the valve is pulled into the closed position, since the second arm is pivoted downwards. When the liquid is introduced and is sufficiently heated, the container is lifted out of the drinking cup, as a result of which the valve opens in the opposite direction to the closing movement just mentioned, so that the heated liquid can pass into the drinking cup.

A certain amount of time is, of course, required until the heated liquid has flowed out of the container into the drinking cup. Expediently, therefore, there is provision for the first arm to have a length which corresponds approximately to $\frac{1}{3}$ to $\frac{2}{3}$ of the height of the container and to be provided at its upper end with a hook-shaped projection. When the container is lifted out, this hook-shaped projection then snaps in over the upper edge of the drinking cup, so that the container can be released and remains in its raised position. After a short time, when the entire liquid has flowed into the drinking cup, the container can then be removed, and the liquid can be drunk or the soup can be spooned out.

Not only in this embodiment, when the drinking cup is cleaned again or another drinking cup is used, the container is ready immediately, without prior cleaning, for preparing the next beverage or another nutritional/luxury food. The drinking cups may, in this case, be reusable drinking cups or commercially available disposable cups.

Another advantageous embodiment is distinguished in that a plurality of levers extending downwards, engaging partially around the bottom and prestressed outwards are provided at the upper edge of the container, said levers being pressed inwards when the container is inserted into the drinking cup and then closing the valve with their lower ends.

As long as the container is not inserted into the drinking cup, the levers are prestressed outwards, that is to say project outwards beyond the lateral container wall. When the container is inserted into the drinking cup, the levers are pressed inwards and at the same time press with their lower ends against the valve and thereby close the latter. When the container is lifted out again after the liquid has been introduced and heated, the levers move outwards again by virtue of their elastic prestress, so that the valve can open downwards.

The actuation of the valve takes place in an especially advantageous and reliable way when the moveable part of the valve is provided on the circumference with two oblique faces of different pitch, on which the lower ends of the levers engage. Expediently, in this case, these lower ends are provided with easily sliding end faces. When the container is inserted into the drinking cup, the levers first engage on the oblique face of greater pitch and at the same time press the valve disc upwards into the closed position. When the front ends of the levers are pressed further inwards by the container being inserted fully into the drinking cup, the front ends of the levers come into the region of the oblique faces of lower pitch, where they then terminate the closing movement with appreciable force and hold the valve reliably in the closed position.

Advantageously, six levers distributed uniformly around the circumference are provided.

It is especially advantageous that, in contrast to conventional heating devices, such as, for example, rapid boilers and the like, where the current connection is made from below, the connection of the heating device is made from the top side of the container. In this case, the connection points of the heating device and of other electrical components can be arranged below the level which the liquid assumes after the container has been filled.

The heating device could, admittedly, be switched off by hand at the moment when the liquid begins to boil. Expediently, and for safety reasons, however, there is provision, in an advantageous embodiment, for the appliance to have a run-dry safety switch and a temperature sensor which are designed as control switches or are connected to such. The current supply is interrupted by means of the temperature sensor as soon as the desired temperature is reached. The run-dry safety switch, which is advantageously reset automatically after some time, prevents the appliance from becoming too hot when there is no liquid in the container.

Advantageously, the appliance has at least one indicator lamp, in particular a light-emitting diode, for indicating the operating state.

What can be achieved, on the one hand, by means of the appliance according to the invention is that, in the assembled state, the centre of gravity is located in the cup, so that the appliance is retained securely in the beverage holder. When a second beverage holder is also provided, as in many motor vehicles, the container in which the water has been heated can be put away in the second beverage holder after use.

The appliance according to the invention and similar appliances may also be utilized in another way, specifically, in particular, in motor vehicles with two beverage holders or one beverage holder for two cans or cups. The container is filled with liquid, as described above, and the latter is heated. The inner container is then not removed from the outer container, but, instead, the unit composed of the inner container and outer container is lifted out of the beverage holder. The liquid is then subsequently poured through the filling orifice of the container into a second drinking cup which is located in the second beverage holder.

BRIEF DESCRIPTION OF THE DRAWINGS

The invention is described below by way of example by means of advantageous embodiments with reference to the accompanying drawings in which, in diagrammatic views.

DETAILED DESCRIPTION OF THE PREFERRED EMBODIMENTS

Figure 1:
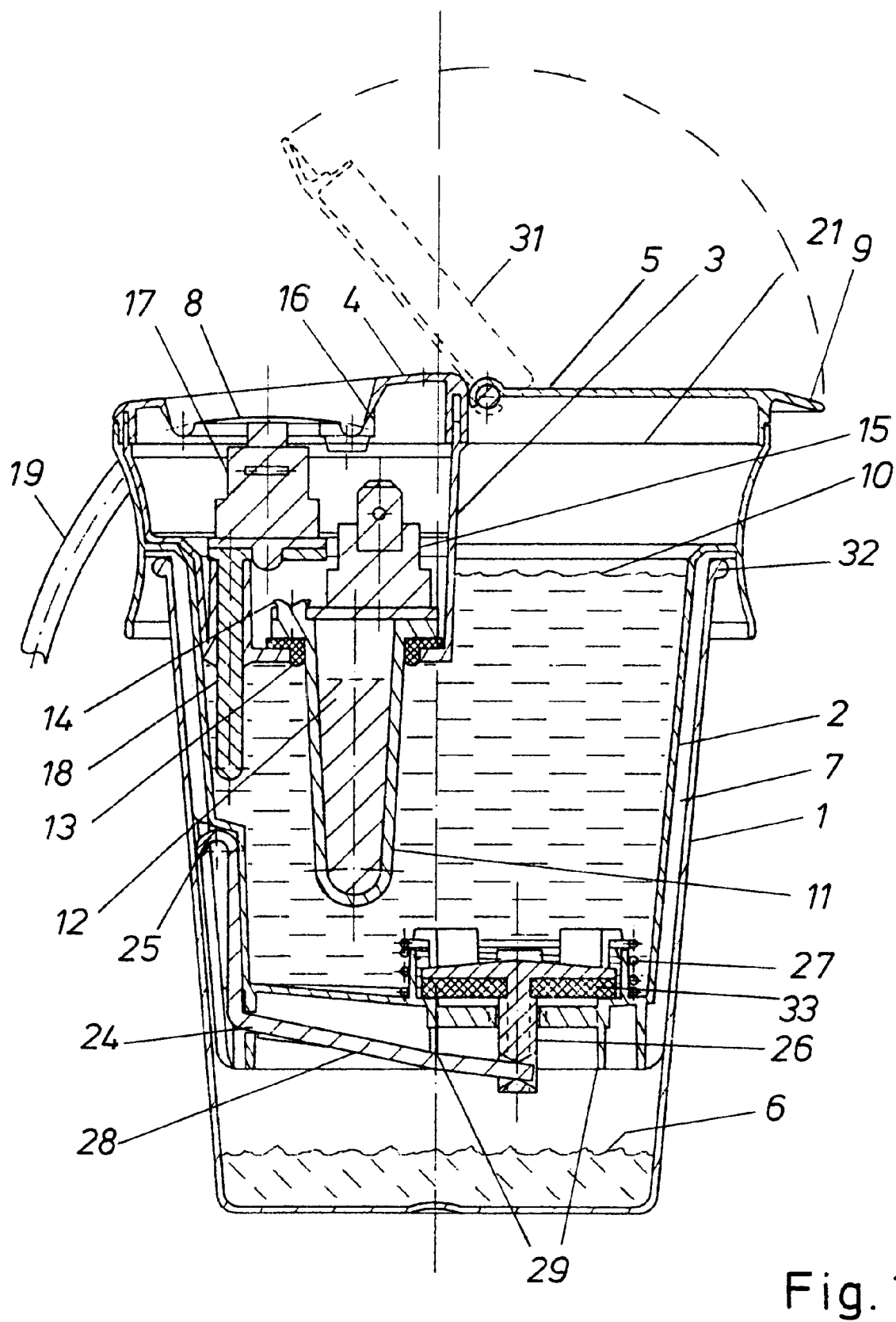
FIG. 1 shows a longitudinal section through a first embodiment of the invention in a first position.
Figure 2:
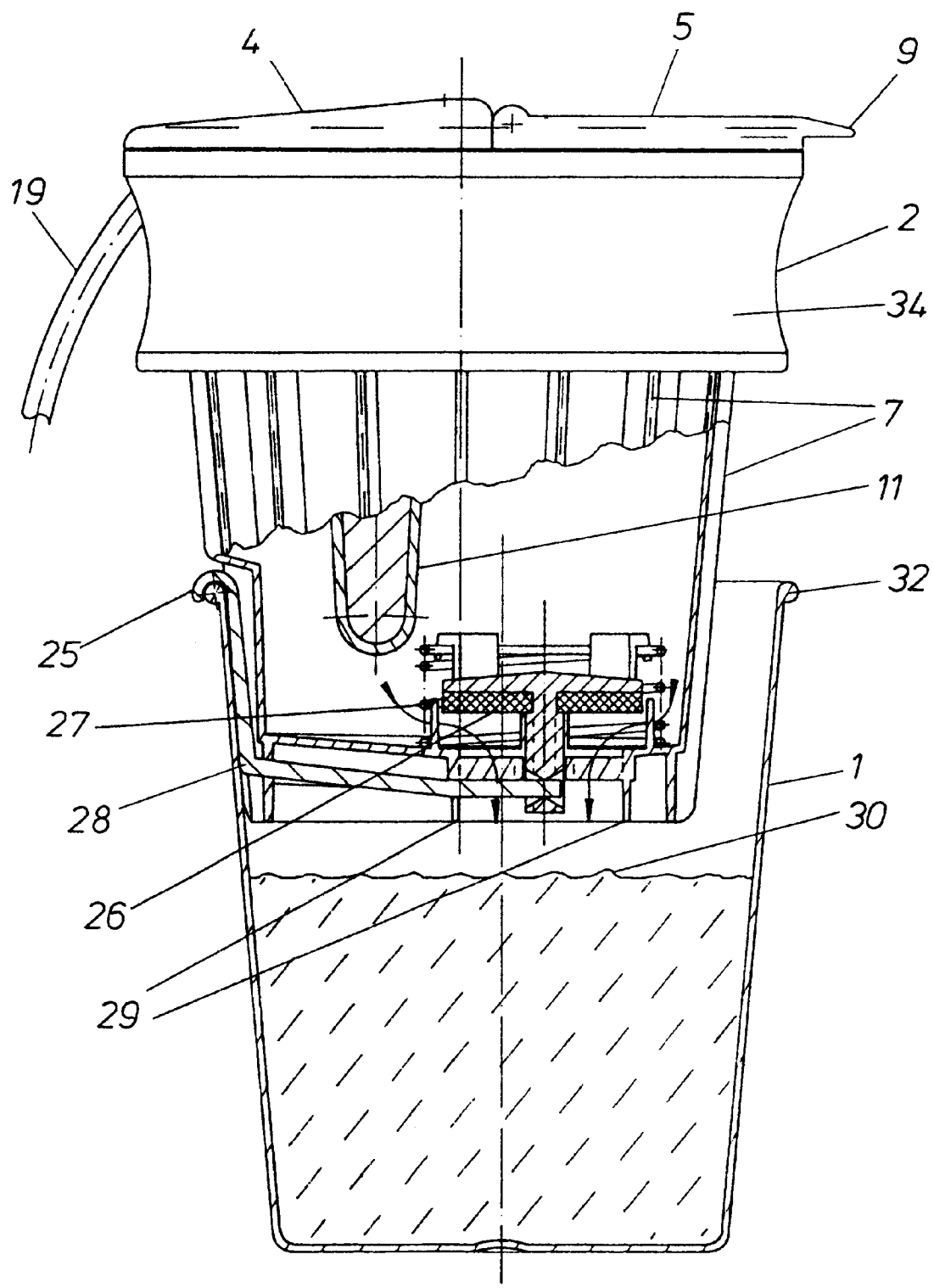
FIG. 2 shows the embodiment of FIG. 1 in a second position.
Figure 3:
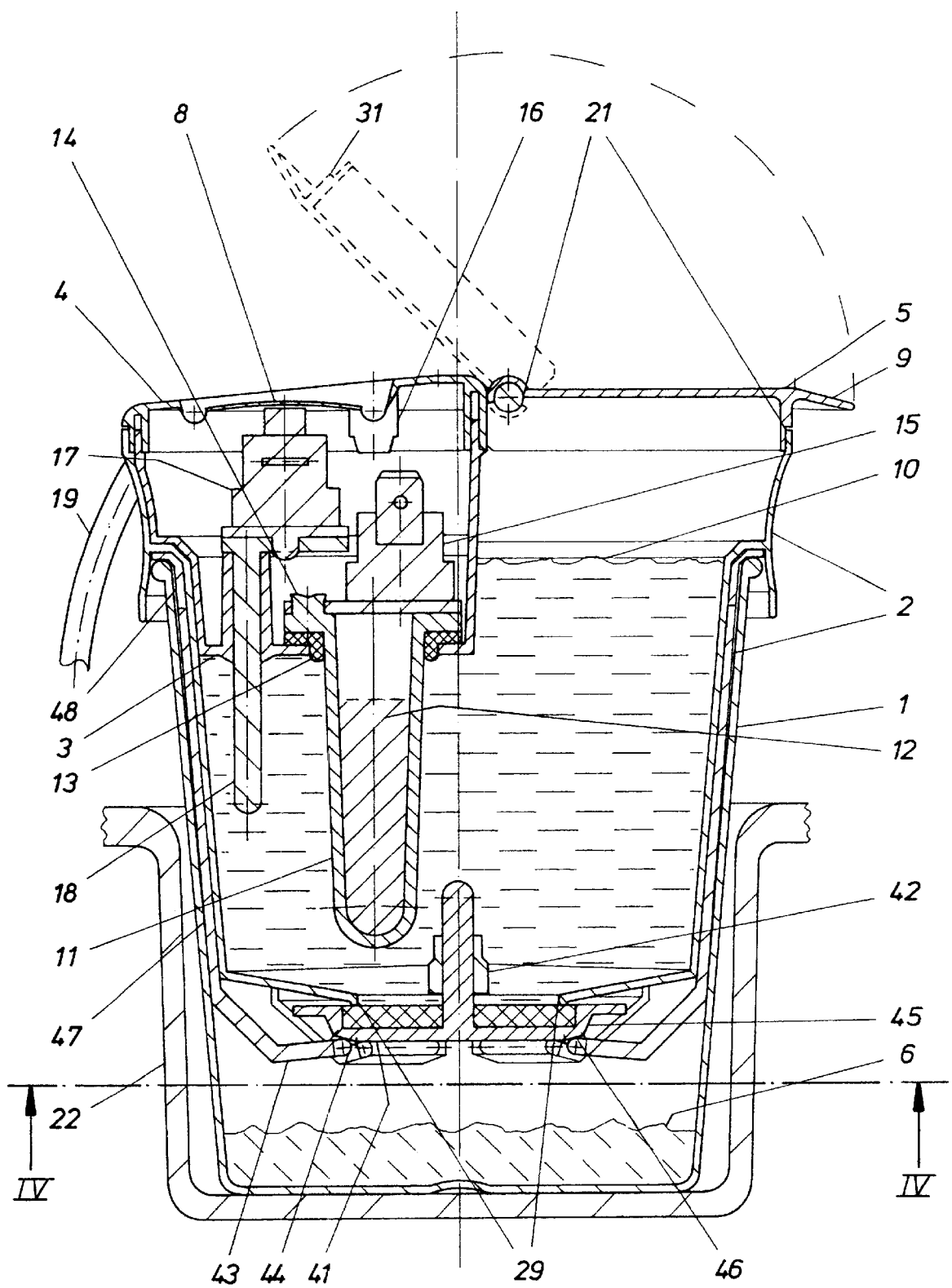
FIG. 3 shows a second embodiment in a first position.

Reference is made first to FIGS. 1 and 2. The embodiment illustrated in these figures has a drinking cup 1 which may be a disposable cup or a cup which can be used more than once. A brewing substance or an extract 6 which is to be brewed up is arranged in this cup at the bottom. The container 1 is provided at the upper edge with a flanging 32, onto which a container 2 taking the form of a water heater can be placed. This container has a heating insert 11 with a corresponding flange; the active heating section is indicated by hatching at 12. A typical power with a voltage of 12 V is, for example, 160 W. Furthermore, a temperature sensor 18 projects into the water filling 10 of the container 2. A run-dry safety switch 15 is also arranged on the heating insert 11. The electrical connections are accommodated in a housing 3 having a housing cover 4. The electrical connections also have a touch contact 8 for switching on the heating, a light-emitting diode socket 16, a function switch with final switch-off 17 and a connecting cable 19. The housing 4 is also protected against the penetration of water by a sealing-off and insulating packing 13. The container 2 can be closed by means of a folding lid 5 which is indicated in the open position at 31. A grip-shaped projection 9 is also provided on the lid 5, so that the lid can be opened more easily. The lid 5 at the same time closes the filling and pouring orifice 21.

Provided in the bottom of the container 2 is a valve 26 having a helical compression spring 27 which prestresses the valve 26 into the open position and at the same time presses the valve disc 33 upwards. Articulated on the actuating rod of the valve 26 is an angled lever 28 which is mounted at 24 on the outer circumference of the container. The angled arm 28 possesses a hook 25 at its upper end. The valve 26 can close the water outflow orifice 29.

Operation is as follows. In the position illustrated in FIG. 1, the container 2 is inserted together with the heating device 11 into the drinking cup 1. The upper arm of the lever 28 is at the same time pressed inwards and with its lower arm pulls the actuating rod of the valve 26 downwards counter to the prestress of the spring 27 and thereby closes the valve 26. The folding lid 5 is opened, and water is introduced. After the folding lid 5 is closed, power is switched on by the actuation of the touch contact 8 which is switched off again after the desired temperature detected by the temperature sensor 18 is reached. The operating state is, in this case, indicated by light-emitting diodes which are arranged, for example, in the socket 16.

When the desired temperature is reached, the container 2 is raised at its grip part 34. The lever 28 is at the same time pivoted anti-clockwise by means of the force of the compression spring 26, so that the upper arm of the lever 28 is pressed outwards. When the position shown in FIG. 2 is reached, the hook 25 snaps in at the flanged edge 32 of the drinking cup 1, so that the container can be released and remains in this position until the heated water has flowed out of the container 2 into the drinking cup 1 and forms the hot beverage liquid 30 there. The container 2 can then subsequently be lifted out of the drinking cup 1 completely, so that the beverage in the drinking cup 1 can be drunk by the latter being lifted off from the base or being lifted out of a beverage holder which is not shown.

Figure 4:
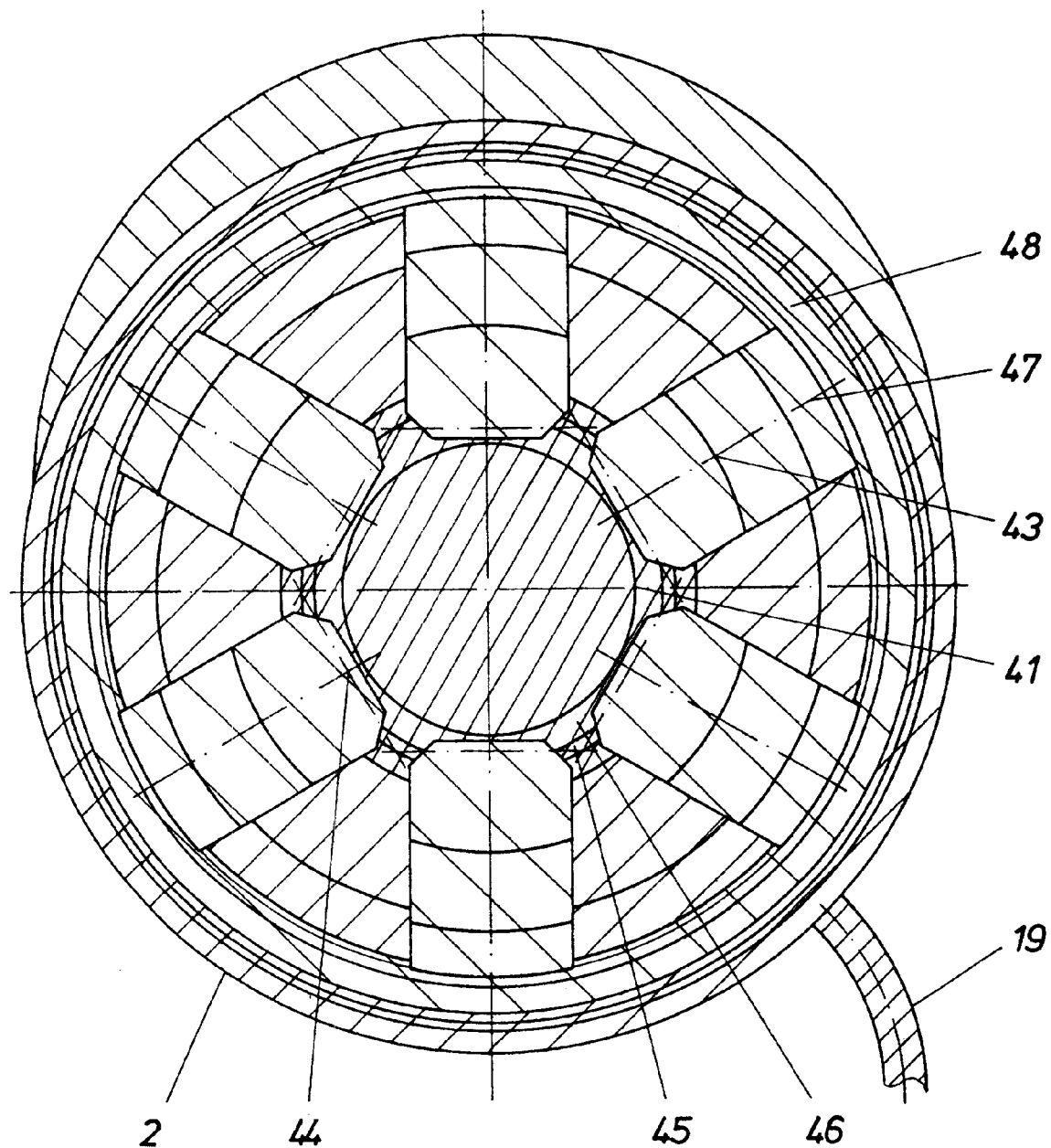
FIG. 4 shows a view along the sectional line IV—IV of FIG. 3.

The embodiment of FIGS. 3 to 7 differs from the embodiment of FIGS. 1 and 2 essentially in the valve and in the type of valve actuation. The other parts are the same and are also designated by the same reference numerals. In the embodiment of FIGS. 3 to 7, 41 designates the valve, by means of which the outflow orifice 29 can be closed. A guide shank is designated by 42. The valve 41 is actuated by angled levers 43 which are fastened to the upper edge of the container 2, whilst the lower part is prestressed pivotably outwards. As shown in FIG. 4, altogether six such levers 43 are provided. When the container 2 is inserted into the drinking cup 1, the levers 43 are pressed inwards and at the same time slide with their slidable front ends 44 initially over a relatively steep oblique face 45 and thereby press the valve into the closed position. The front slidable ends 44 then subsequently reach a lower pitch 46, by means of which the final closing movement is brought about with appreciable force and the valve 41 is held in the closed position. In the embodiment shown in FIG. 3, the drinking cup 1 is arranged in a beverage holder 22, such as is to be found in various embodiments, for example in motor vehicles.

Figure 5:
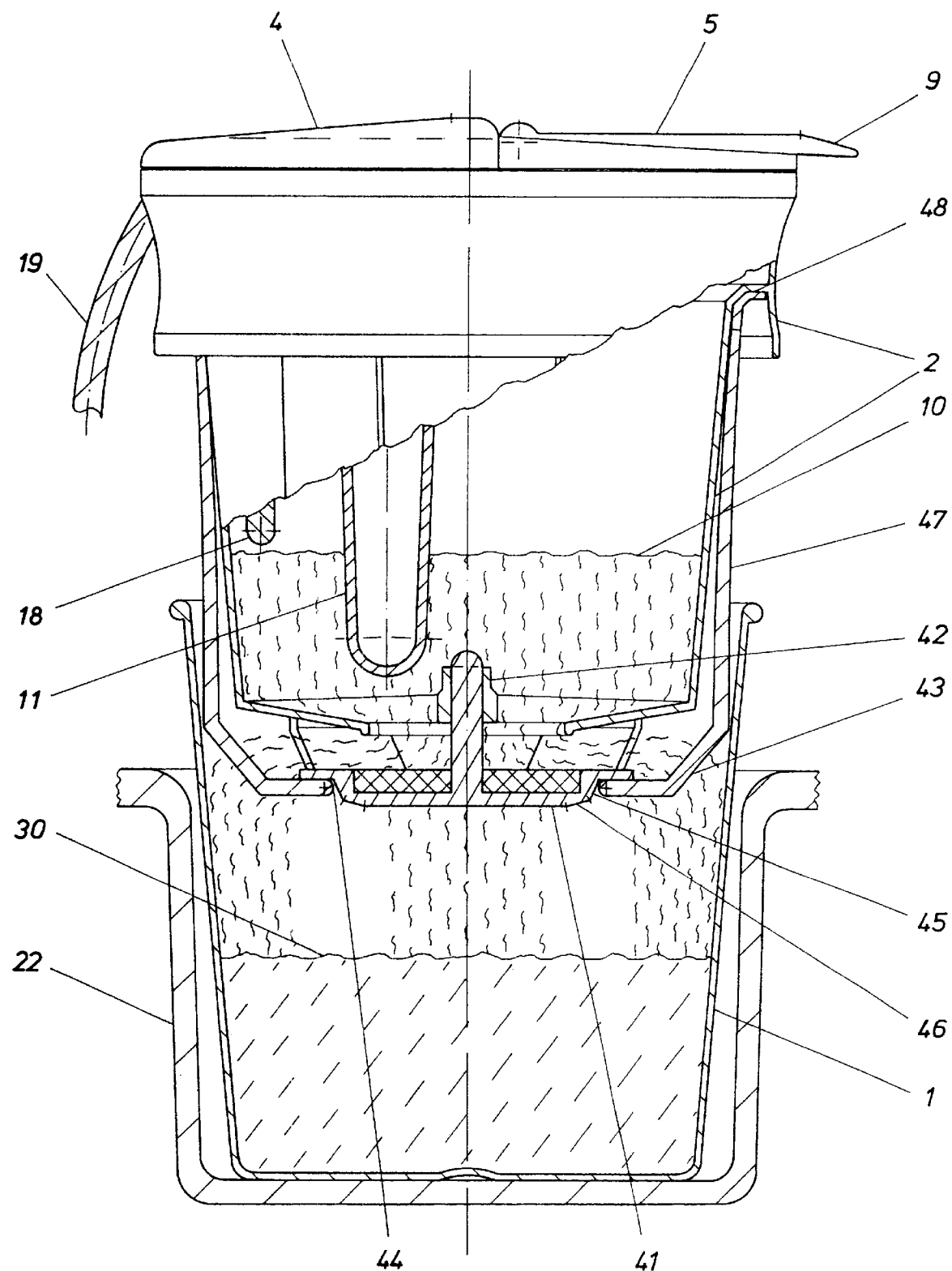
FIG. 5 shows the embodiment of FIG. 3 in a second position.

As shown in FIG. 4, the arms 43 need not be resilient as a whole, but may be prestressed by valve-lever springs 47. In this case, the base, to which the springs are fastened, is shown at 48. If, then, as shown in FIG. 5, the container 2 is lifted out of the drinking cup 1, the levers 44 are moved outwards by spring action and open the valve 41, so that the heated water can flow into the drinking cup 1 and can form the hot beverage liquid 30 there. After the container 2 is lifted out completely, the hot beverage can then be tasted, as in the embodiment of FIGS. 1 and 2, by the drinking cup 1 being lifted out of the holder 2.

Figure 6:
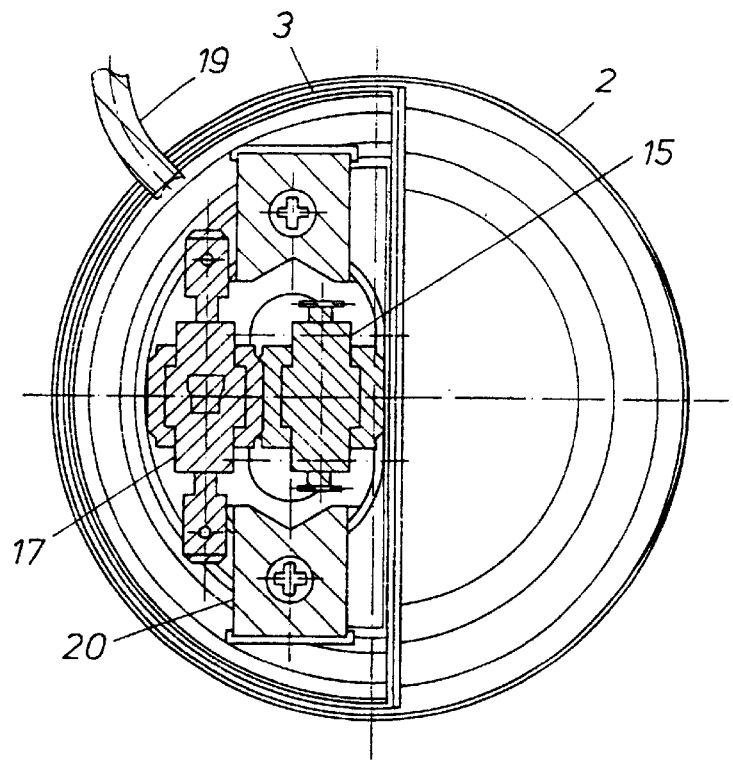
FIG. 6 shows a view into the container 3 from above, the housing cover being removed.
Figure 7:
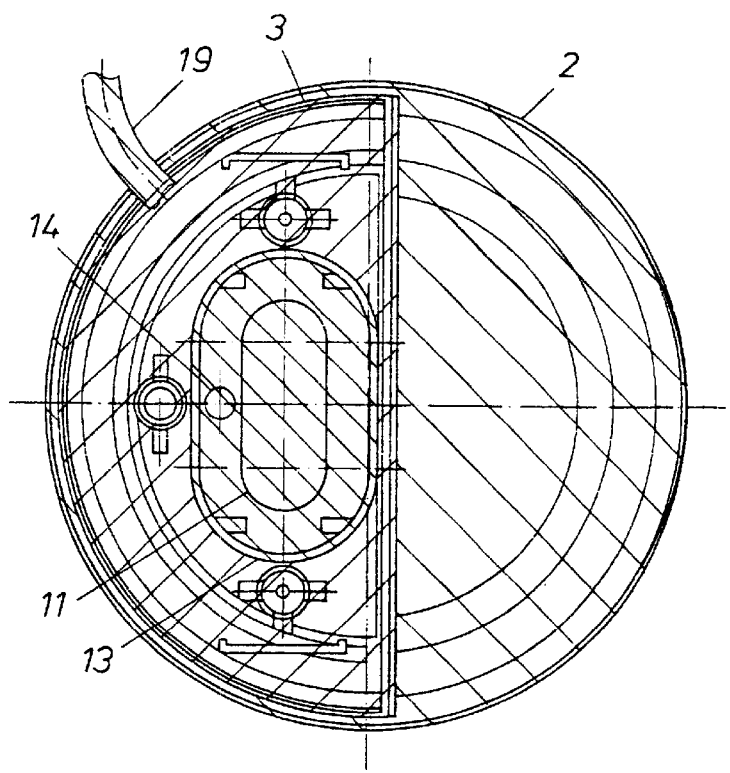
FIG. 7 shows a similar view to that in FIG. 6 of the heating insert, elements, such as switches and holding clips, arranged above it being removed.

FIGS. 6 and 7 show the geometric arrangement of the various electrical parts, as seen from above. Thus, FIG. 6 shows the switches 15 and 17 and the holding clips 20 for the heating insert 11, whilst, in the illustration of FIG. 7, these are removed.

Figure 8:
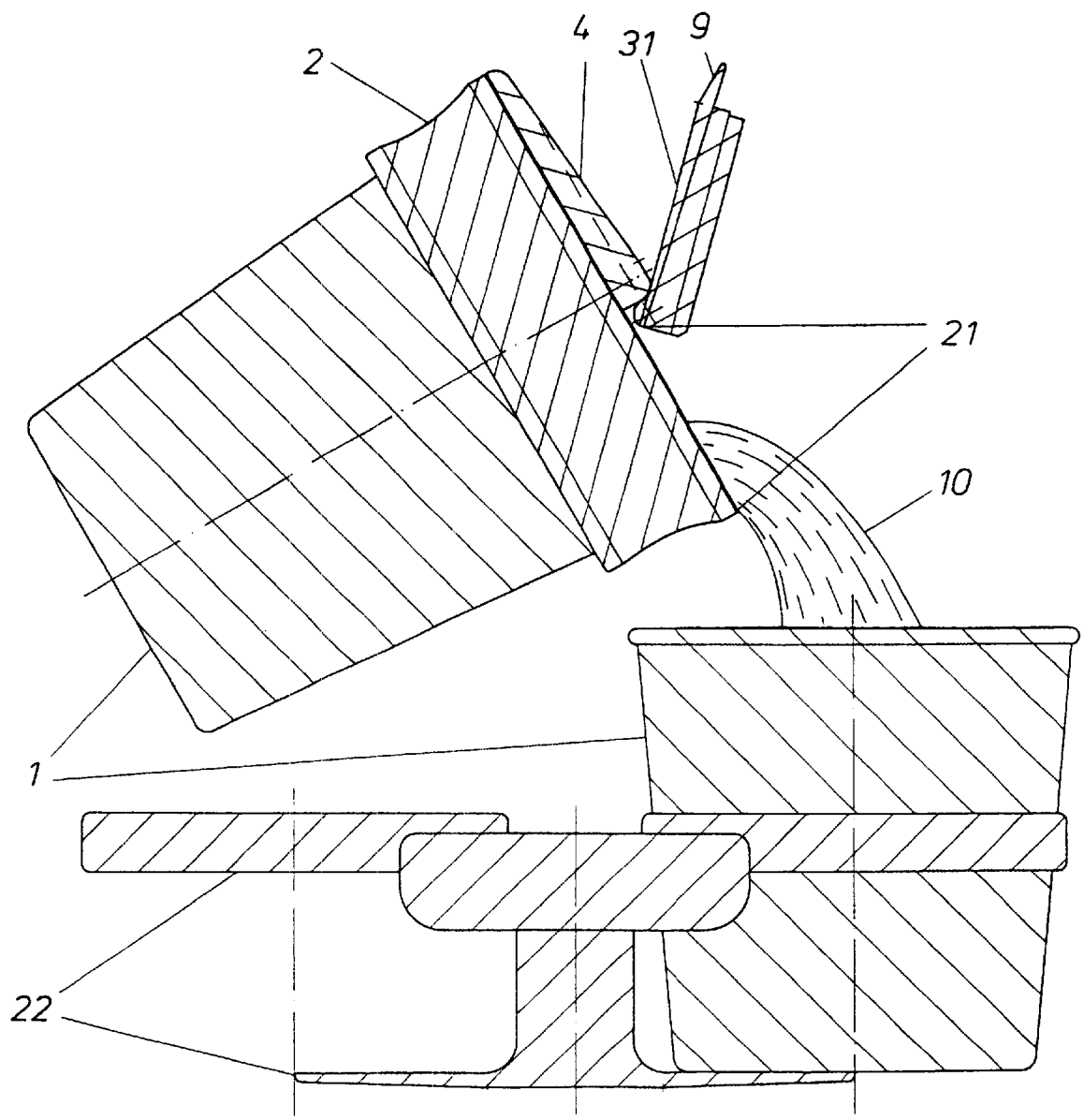
FIG. 8 shows another type of use of the appliance according to the invention.

FIG. 8 shows diagrammatically a somewhat different method whereby beverages and the like can be brewed up. This method may advantageously be employed when there are two beverage holders 22 or else there is one beverage holder 22 for two drinking cups 1. The water is, in this case, heated, as above, in the container 2 according to the invention. The container 2 is at the same time located in the drinking cup 1. The valve is, in this case, closed due to the fact that the container 2 is located in the drinking cup 1. When the water 10 is heated sufficiently, the container 2 is not removed from the drinking cup. Instead, the drinking cup 1 and the container 2 are lifted together out of the holder 22, and the water 10 is transferred into the other drinking cup 1 in which the brewing substance 6 is located. This method can also be carried out with containers 2 which have no valve, in which case the drinking cup 1 into which the container 2 is inserted serves as a holder and as thermal insulation.

What is claimed is:

1. Appliance for the preparation of hot beverages, soups and similar liquids, comprising:

a drinking cup;

a container, adapted for receiving the liquid, including a lower portion defining an orifice, a valve disposed in the orifice, and an actuator lever connected to the valve, the container being moveable between withdrawn and inserted positions, at least the lower portion of the container being disposed within the drinking cup when the container is in the inserted position, the actuator lever being dimensioned and configured for closing the valve when the container is in the inserted position and opening the valve when the container is in the withdrawn position; and a heating device disposed within the container, the heating device being adapted for heating the liquid;

whereby, after being heated, the liquid is emptied into the drinking cup through the orifice by moving the container from the inserted position to the withdrawn position.

2. Appliance for the preparation of hot beverages, soups and similar liquids, comprising:

a drinking cup;

a container, adapted for receiving the liquid, including a lower portion having a bottom defining an orifice, a valve disposed in the orifice, and an actuator lever, the container being moveable between withdrawn and inserted positions, at least the lower portion of the container being disposed within the drinking cup when the container is in the inserted position, a biasing force urging the valve to open the orifice, the actuator lever including a bearing point pivotally mounted to the lower portion, a first arm extending upwards from the bearing point and a second arm extending downwards below the bottom to engage the valve; and a heating device disposed within the container, the heating device being adapted for heating the liquid;

wherein the first arm pivots the second arm to close the orifice when the container is moved from the withdrawn position to the inserted position and the biasing force opens the orifice when the container is moved from the inserted position to the withdrawn position, whereby, after being heated, the liquid is emptied into the drinking cup through the orifice by moving the container from the inserted position to the withdrawn position.

3. Appliance according to claim 2, wherein the container has a height and the first arm has a length which corresponds approximately to $1/3$ to $2/3$ of the height of the container and is provided at its upper end with a hook-shaped projection.

4. Appliance according to claim 3, wherein the heating device has an electrical connection disposed at a top side of the container.

5. Appliance according to claim 3, further comprising at least one indicator lamp for indicating the operating state of the heating device.

6. Appliance according to claim 2, wherein the heating device has an electrical connection disposed at a top side of the container.

7. Appliance according to claim 2, further comprising a run-dry safety switch, a temperature sensor and at least one control switch in electrical connection with the heating device.

8. Appliance according to claim 2, further comprising at least one indicator lamp for indicating the operating state of the heating device.

9. Appliance according to claim 2, further comprising a run-dry safety switch and a temperature sensor.

10. Appliance for the preparation of hot beverages, soups and similar liquids, comprising:

a drinking cup;

a container, adapted for receiving the liquid, including a lower portion defining an orifice, a valve disposed in the orifice, and an actuator lever connected to the valve, the container being moveable between withdrawn and inserted positions, at least the lower portion of the container being disposed within the drinking cup when the container is in the inserted position, the actuator lever being dimensioned and configured for closing the valve when the container is in the inserted position and opening the valve when the container is in the withdrawn position;

a heating device disposed within the container, the heating device being adapted for heating the liquid; and at least one indicator lamp for indicating the operating state of the heating device;

whereby, after being heated, the liquid is emptied into the drinking cup through the orifice by moving the container from the inserted position to the withdrawn position.

11. Appliance according to claim 10, wherein the at least one indicator lamp is a light emitting diode.

12. Appliance for the preparation of hot beverages, soups and similar liquids, comprising:

a drinking cup;

a container, adapted for receiving the liquid, including a lower portion defining an orifice, a valve disposed in the orifice, and an actuator lever connected to the valve, the container being moveable between withdrawn and inserted positions, at least the lower portion of the container being disposed within the drinking cup when the container is in the inserted position, the actuator lever being dimensioned and configured for closing the valve when the container is in the inserted position and opening the valve when the container is in the withdrawn position;

a heating device disposed within the container, the heating device being adapted for heating the liquid;

a run-dry safety switch; and a temperature sensor in electrical connection with the heating device;

whereby, after being heated, the liquid is emptied into the drinking cup through the orifice by moving the container from the inserted position to the withdrawn position.

13. Appliance according to claim 12, the heating device, run-dry safety switch and temperature sensor each have an electrical connection point disposed below a level which the liquid assumes after the container has been filled.

14. Appliance for the preparation of hot beverages, soups and similar liquids, comprising:

a drinking cup;

a container, adapted for receiving the liquid, including an upper edge, a lower portion having a bottom defining an orifice, a valve disposed in the orifice, and a plurality of actuator levers, the container being moveable between withdrawn and inserted positions, at least the lower portion of the container being disposed within the drinking cup when the container is in the inserted position, each of the levers extending downwards from an upper end disposed proximate to the upper edge to a lower end disposed proximate to the bottom, the upper ends of the levers being pressed inwards and the lower ends of the levers closing the valve when the container is moved to the inserted position, the valve opening when the container is moved to the withdrawn position; and a heating device disposed within the container, the heating device being adapted for heating the liquid;

whereby, after being heated, the liquid is emptied into the drinking cup through the orifice by moving the container from the inserted position to the withdrawn position.

15. Appliance according to claim 14, wherein the valve has a circumference including two oblique faces, each of the faces having a different pitch, the lower ends of the levers engaging the faces of the valve.

16. Appliance according to claim 5, wherein the plurality of levers comprises six levers which are distributed uniformly around the circumference of the valve.

17. Appliance according to claim 14, wherein the plurality of levers comprises six circumferentially distributed levers.

18. Appliance for the preparation of hot beverages, soups and similar liquids, comprising:

a drinking cup;

a container, adapted for receiving the liquid to a fill level, including a lower portion defining an orifice, a valve disposed in the orifice, and an actuator lever connected to the valve, the container being moveable between withdrawn and inserted positions, at least the lower portion of the container being disposed within the drinking cup when the container is in the inserted position, the actuator lever being dimensioned and configured for closing the valve when the container is in the inserted position and opening the valve when the container is in the withdrawn position;

a heating device adapted for heating the liquid disposed within the container, the heating device having an electrical connection point; and at least one control switch, the control switch having an electrical connection point in electrical communication with the electrical connection point of the heating device, the electrical connection points of the heating device and of the control switch being arranged below the fill level of the liquid;

whereby, after being heated, the liquid is emptied into the drinking cup through the orifice by moving the container from the inserted position to the withdrawn position.

* * * * *

UNITED STATES PATENT AND TRADEMARK OFFICE
CERTIFICATE OF CORRECTION

PATENT NO. : 6,443,050 B2
DATED : September 3, 2002
INVENTOR(S) : Timm

It is certified that error appears in the above-identified patent and that said Letters Patent is hereby corrected as shown below:

Column 8,
Line 20, delete "5" and insert -- 15 --.

Signed and Sealed this

Fifteenth Day of April, 2003

JAMES E. ROGAN
*Director of the United States Patent and Trademark Office*